United States Patent

[11] 3,576,943

[72] Inventor Hans-Dieter Schneider
Gross-Gerau, Germany
[21] Appl. No. 756,671
[22] Filed Aug. 30, 1968
[45] Patented May 4, 1971
[73] Assignee Fernseh G.m.b.H.
Darmstadt, Germany
[32] Priority Aug. 31, 1967
[33] Germany
[31] P 15 37 117.2

[54] COLOR TELEVISION MIXING ARRANGEMENT
8 Claims, 1 Drawing Fig.

[52] U.S. Cl. ........ 178/5.4
[51] Int. Cl. ........ H04n 9/32
[50] Field of Search ........ 178/5.4
(CK), 5.2 (A), 5.2, 5.4 (4TEC), 5.4 (MAT)

[56] References Cited
UNITED STATES PATENTS

| | | | |
|---|---|---|---|
| 2,811,577 | 10/1957 | Luck | 178/5.2 |
| 2,845,479 | 7/1958 | Goldberg et al. | 178/5.2 |
| 3,196,205 | 7/1965 | Bedford | 178/5.4 |
| 3,272,916 | 9/1966 | James et al. | 178/5.4 |

*Primary Examiner*—Richard Murray
*Assistant Examiner*—Alfred H. Eddleman
*Attorney*—Michael S. Striker

ABSTRACT: An arrangement in the transmission of color television. Color component signals are applied to amplifiers which, in turn, provide outputs mixed with the luminance signal component. The mixing is performed in a network of summing resistors. Each of the color component signals is mixed with a luminance signal component such that the latter has an amplitude which varies inversely with the amplitude of the luminance signal.

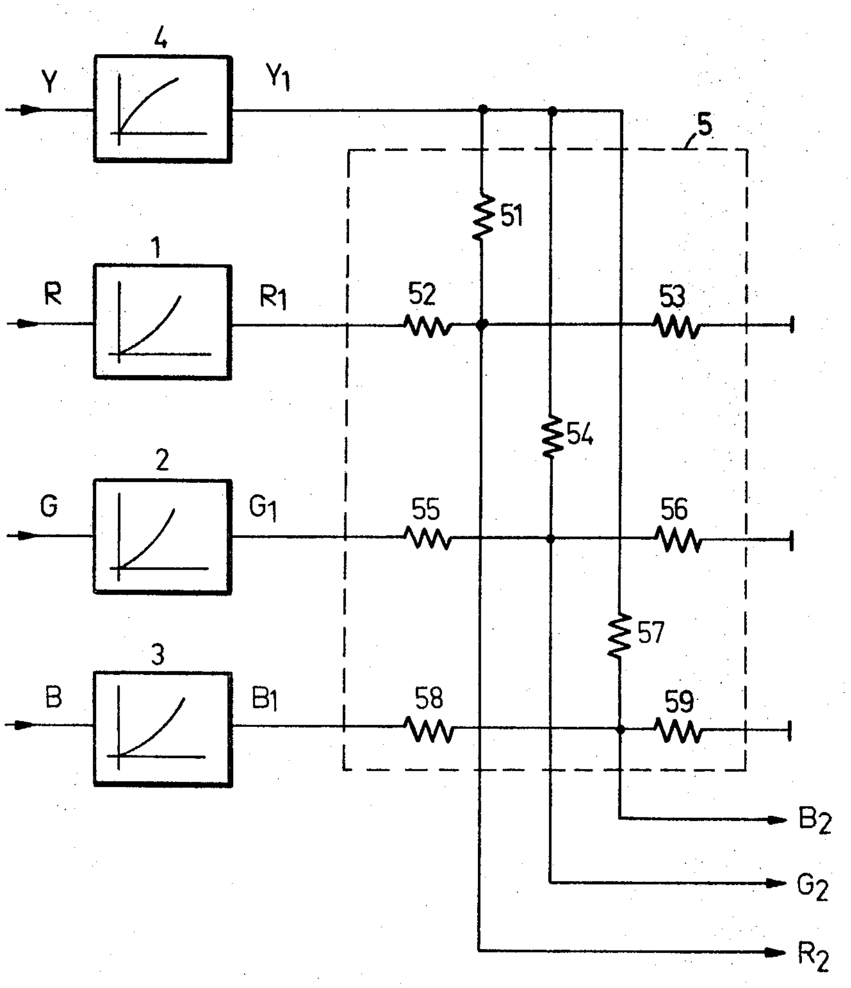
Inventor:
Hans-Dieter Schneider
by Michael J. Striker
Attorney

COLOR TELEVISION MIXING ARRANGEMENT

BACKGROUND OF THE INVENTION

In the transmission of color television information, it is well known in the art that three signals are required. The systems in present use have for these three signals, a luminance signal and two color difference signals. These three signals are formed at the transmitter by coding from three color component signals as for example, R, G and B. These color component signals are themselves derived from scanning three color component images of the three primary colors. The luminance signal is also often generated by directly scanning a panchromatic image.

Independent of the manner in which the three signals are generated and transmitted, the three color component signals are required at the receiver for controlling the three differently colored picture elements. To generate a correct color picture, it is essential that the amplitude of the three color component signals correspond to the color distribution of the transmitted object. At the same time, it is equally essential that the black levels of the three signals be exactly the same, in order to realize a satisfactory and correct color picture. If these conditions are not observed, and the levels of the color component signals for picture black are somewhat different from each other, picture black in the receiver does not appear black, but is instead reproduced with a trace of color. This applies equally well to picture portions of low brightness which should appear dark gray in the picture.

The black levels of the color component signals are produced by clamping on the "back porch" of the signals. The "back porch" of the color component signal corresponds to the level determined by blanking and clipping while generating the color component signal. The blanking level differs from picture black by the "lift" as it is commonly known. This blanking level should have precisely the same magnitude in the three color component signals. This condition is required so that the black and dark gray signals may be reproduced without any trace of colors.

In practice, it is not always possible to fulfill the requirement of precisely equal lifts in the color component signals generated by the different signal sources. The resulting distortion in the black or gray portions of the picture, cannot be removed by processing and after the reception of the color television signal. This is because various black level control circuits in the signal transmission path operate on the blanked black levels in the individual signals.

The present invention overcomes such disadvantageous distortion by providing color television transmission apparatus which includes circuitry for developing a luminance signal and a plurality of color component signals. In accordance with the present invention, each of the plurality of color component signals is mixed with a luminance signal component having an amplitude which varies inversely with the amplitude of the luminance signal.

SUMMARY OF THE INVENTION

An arrangement in the transmission of color television in which a luminance signal and a plurality of color component signals are generated. The generated signals are applied to a mixer which mixes a luminance signal component with each of the color component signals. The luminance signal component has an amplitude which varies inversely with the amplitude of the luminance signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electrical schematic diagram showing the amplifiers by which the luminance signal component and the color component signals are generated and mixed, in accordance with the present invention.

DESCRIPTION OF THE PREFERRED EMBODIMENTS

Referring to the drawing, the three color component signals, R, G and B are applied to individual amplifiers 1, 2 and 3, respectively. The transmission factor of these amplifiers is smaller for low signal amplitudes than for large signal amplitudes. The graphical representation within the boxes denoting the amplifiers, are representative of the condition that the relationship between the input signal amplitude I and the output signal amplitude O is of exponential form.

The amplifier may, on the other hand, be designed to have a small range of very low gain and over the remaining portion of the range, a higher uniform gain. A substantially sharp knee may prevail at the transition. This type of characteristics may, for example, be achieved through the use of a diode in the amplifier circuit.

The luminance signal Y is applied to a nonlinear amplifier 4. The response or transfer characteristics of this amplifier 4 are the inverse of that associated with the amplifiers 1, 2 and 3. The transmission factor of amplifier 4 is, therefore, high for small input signal amplitudes, and decreases with increase in the input signal amplitude. The variation of the characteristics may be represented by a smooth curve as shown by the graphical representation within the box shown on the drawing. At the same time, the characteristics may be in the form of high-gain and low-gain portions with a sharp knee representing the transition between these portions.

The outputs of the amplifiers, $R_1$, $G_1$, $B_1$ and $Y_1$ are applied to a mixing circuit 5 denoted by the dashed lines 5. In this mixing circuit, components of the modified luminance signal $Y_1$ are added to the three modified color component signals $R_1$, $G_1$ and $B_1$. For small signal amplitudes, therefore, the luminance signal component is dominant in the color component signals $R_2$, $G_2$ and $B_2$ resulting from the mixing circuit. The dominance of the luminance signal component diminishes with increasing signal amplitude in favor of the color component signals. The total amplitude of the color component signals $R_2$, $G_2$ and $R_2$, therefore, remains equal to the amplitude of the color component signals R, G and B applied as inputs to the arrangement of amplifiers.

The mixer 5 is constructed of a plurality of resistors which perform summing functions. Individual resistors 52, 55 and 58 are connected to the outputs of the amplifiers 1, 2 and 3, respectively. Three additional resistors 51, 54 and 57 are connected at one common terminal to the output of the amplifier 4. The other terminals of the resistors 51, 54 and 57 are connected to the resistors 52, 55 and 58, respectively. The combination of resistor 51 and 52, for example, forms a summing network by which the signal $Y_1$ is added to the signal $R_1$, The resistors 53, 56 and 59 connected to the junctions of the summing resistors, are output resistors which facilitate the summing function. The other ends of the resistors 53, 56 and 59 are connected to ground potential so that a proper summing network is realized. The signals $B_2$, $G_2$ and $R_2$ represent the mixed output signals from the mixer 5.

I claim:

1. An arrangement for the transmission of color television comprising, in combination, nonlinear signal-generating means for generating a luminance signal and a plurality of color component signals; resistive mixing means connected to said signal-generating means for mixing a luminance signal component with each of said color component signals; and means in said signal-generating means for varying nonlinearly the amplitude of said luminance signal component with the amplitude of said luminance signal.

2. An arrangement for the transmission of color television comprising, in combination, signal-generating means for generating a luminance signal and a plurality of color component signals; mixing means connected to said signal-generating means for mixing a luminance signal component with each of said color component signals; means in said signal-generating means for varying nonlinearly the amplitude of said luminance signal component with the amplitude of said luminance signal; amplifying means for amplifying each of said color component signals applied to said mixing means, the gain of said amplifying means for said color component signals increasing with increasing signal amplitude; and luminance-signal-amplifying means for amplifying said luminance signal applied to said mixing means, said luminance amplifier means having a gain diminishing with increasing input signal amplitude, said luminance signal amplified by said luminance-amplifying means being mixed with said color component signals in said mixing means.

3. The arrangement for the transmission of color television as defined in claim 2 wherein said amplifying means for said color component signals comprises individual amplifiers, each color component signal being applied to an individual amplifier.

4. The arrangement for the transmission of color television as defined in claim 3 including means in said amplifiers whereby the sum of each combination of a luminance signal component with a color component signal is proportional to the amplitude of the corresponding color component signal applied to said amplifiers.

5. The arrangement for the transmission of color television as defined in claim 1 wherein said mixing means comprises a summing network with summing resistors connected to each of said color component signals and said luminance signal component.

6. The arrangement for the transmission of color television as defined in claim 3 wherein said mixing means comprises a plurality of resistors each being connected to one of the outputs of said individual amplifiers, each of said resistors being also connected to said luminance signal component for mixing the same with the output of said amplifier.

7. The arrangement for the transmission of color television as defined in claim 6 including further resistor means connected between said amplifier associated with said luminance signal component and said resistor connected to the output of said individual amplifier associated with said color component signal.

8. The arrangement for the transmission of color television as defined in claim 7 including an output resistor in said mixing means connected to the junction of said further resistor and said resistor connected to said individual amplifier associated with said color component signal, said output resistor being connected to the output of said mixing means for providing an output signal representing the summation of the luminance signal component and said color component signal.